United States Patent
Grazzi et al.

(10) Patent No.: US 10,814,588 B2
(45) Date of Patent: Oct. 27, 2020

(54) BUTENE-1 COPOLYMER TIE LAYER IN MULTILAYER FILM STRUCTURES HAVING A LOW SEAL TEMPERATURE AND IMPROVED HOT TACK

(71) Applicant: BASELL POLIOLEFINE ITALIA S.R.L., Milan (IT)

(72) Inventors: Michele Grazzi, Ferrara (IT); Roberta Marchini, Ferrara (IT); Giampaolo Pellegatti, Ferrara (IT); Stefano Spataro, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 128 days.

(21) Appl. No.: 14/896,638

(22) PCT Filed: May 6, 2014

(86) PCT No.: PCT/EP2014/059197
§ 371 (c)(1),
(2) Date: Dec. 7, 2015

(87) PCT Pub. No.: WO2014/195072
PCT Pub. Date: Dec. 11, 2014

(65) Prior Publication Data
US 2016/0121580 A1 May 5, 2016

(30) Foreign Application Priority Data
Jun. 5, 2013 (EP) ..................................... 13170609

(51) Int. Cl.
B32B 7/12 (2006.01)
B32B 27/08 (2006.01)
B32B 27/32 (2006.01)

(52) U.S. Cl.
CPC ............... *B32B 7/12* (2013.01); *B32B 27/08* (2013.01); *B32B 27/32* (2013.01); *B32B 2250/24* (2013.01); *B32B 2250/242* (2013.01); *B32B 2307/308* (2013.01); *B32B 2307/31* (2013.01); *B32B 2307/518* (2013.01); *B32B 2307/704* (2013.01)

(58) Field of Classification Search
CPC ........... B32B 7/12; B32B 27/32; B32B 27/08; B32B 2250/242; B32B 2307/308; B32B 2307/518; B32B 2307/31
See application file for complete search history.

(56) References Cited

U.S. PATENT DOCUMENTS

| | | | |
|---|---|---|---|
| 5,342,695 A | 8/1994 | Tsurutani et al. | |
| 5,472,792 A | 12/1995 | Tsurutani et al. | |
| 5,623,021 A | 4/1997 | Pelliconi et al. | |
| 6,395,831 B1 | 5/2002 | Pelliconi et al. | |
| 2005/0058825 A1* | 3/2005 | Mackerron | B32B 27/20 428/323 |
| 2010/0056719 A1* | 3/2010 | Marzolla | C08J 5/18 525/53 |
| 2012/0171405 A1 | 7/2012 | Pasquali et al. | |
| 2012/0225999 A1* | 9/2012 | Hirata | B32B 27/32 525/240 |
| 2013/0202836 A1* | 8/2013 | Musacchi | C09J 123/20 428/41.3 |

FOREIGN PATENT DOCUMENTS

| | | |
|---|---|---|
| CN | 1275144 A | 11/2000 |
| EP | 0353655 A2 | 2/1990 |
| EP | 0533493 A1 | 3/1993 |
| EP | 0674991 A1 | 10/1995 |
| WO | WO-2011036077 A1 | 3/2011 |
| WO | WO2011064124 * | 6/2011 |
| WO | WO2012052429 * | 4/2012 |
| WO | WO-2012052429 A1 | 4/2012 |

OTHER PUBLICATIONS

PCT International Search Report and the Written Opinion—dated Jul. 3, 2014 for Corresponding PCT/EP2014/059197.

* cited by examiner

*Primary Examiner* — Samir Shah

(57) ABSTRACT

Multilayer film (BOPP) structure containing at least: A) a skin (outer) layer substantially consisting of a crystalline low seal Initiation temperature propylene copolymer; B) a tie layer substantially consisting of a butene-1 copolymer having flexural modulus (MEF) of 75 MPa or less; C) a core layer substantially consisting of one or more polypropylene homopolymers designed for BOPP.

3 Claims, No Drawings

BUTENE-1 COPOLYMER TIE LAYER IN MULTILAYER FILM STRUCTURES HAVING A LOW SEAL TEMPERATURE AND IMPROVED HOT TACK

This application is the U.S. National Phase of PCT International Application PCT/EP2014/059197, filed May 6, 2014, claiming benefit of priority to European Patent Application No. 13170609.5, filed Jun. 5, 2013, the contents of which are incorporated herein by reference in its entirety.

FIELD OF THE INVENTION

The present disclosure relates to butene-1 copolymers that are useful in the preparation of heat-sealable films, including as tie layers in multilayer film structures.

BACKGROUND OF THE INVENTION

Copolymers of propylene with other olefins such as ethylene and/or butene-1 as well as mixtures of such copolymers with other olefin polymers are often referred to as heat-sealable materials. These copolymers are obtained by polymerizing propylene with minor amounts of other olefin comonomers in the presence of coordination catalysts. The polymerized comonomer units are statistically distributed in the resulting copolymer and the melting point of said copolymers is generally lower than the melting point of crystalline propylene homopolymers. The seal initiation temperature of such copolymers may also be correspondingly low.

However, particularly demanding applications of films, like form and fill packaging, require not only a low seal initiation temperature (hereinafter called "S.I.T."), but also a good "hot tack". As explained in U.S. Pat. No. 4,725,505, hot tack is the bonding strength measurable while the polymer in the heat sealed portion of a film is still in the semi-molten/solidifying state. Form and fill packaging is often used in food packaging, e.g. for the production of bags to be used for solid and/or liquid products. The bags are produced with packaging machines that simultaneously seal the bottom seam of the bag and fills it while it is in the vertical or horizontal position. Thus the sealing, while still in the semi-molten/solidifying state, must be able to withstand the weight of the product introduced in the bag and also the pressure of air used to assist in transport of the product.

According to U.S. Pat. No. 4,725,505, the hot tack is improved by adding at least 40% by weight of a butene-1-propylene copolymer to a propylene-ethylene copolymer. The resulting hot tack strength values, measured by carrying out the test under air pressure, are in the range of 10-15 inches of water.

According to U.S. Pat. App. No. 2005/0142367, relatively high values of hot tack strength are achieved by blending a propylene-butene-1-ethylene terpolymer with a metallocene catalyzed ethylene polymer. The terpolymer used in the examples contains relatively high amounts of comonomers, namely 1.7 mol % of ethylene and 16.2 mol % of butene-1. The hot tack strength values obtained are typically lower than 250 g (about 2.5 N). At 210° F. (about 99° C.) the value is lower than 200. It appears to be insufficient at temperatures lower than 200° F. (about 93° C.).

WO 2011/064124 and WO 2011/064119 disclose polyolefin compositions particularly useful for the preparation of films, including multilayer films where at least one layer comprises a polyolefin composition providing improved seal initiation temperature (S.I.T.) and hot tack properties. The layer comprising said composition acts as a sealing layer (outermost layer) in the S.I.T. and hot tack test.

In WO 2007/047133, multilayer film structures are disclosed including tie layers having thicknesses of 25 micron or less, where a first polymer present in a "core layer" is also present in the "tie layer" optionally in blend with a further tie layer polymer. The first polymer is contributing to the improvement of the seal strength and a reduced minimum seal temperature of the multilayer structure over the control examples. The first polymer can be a propylene or an ethylene based plastomer or elastomer or a butene-1 polymer (homo- or copolymer).

However, there is still a need to improve hot tack and seal strength in multilayer structures. It has now surprisingly been found that an improvement of such properties and particularly a balance of heat-sealability (sufficiently low S.I.T.) and hot tack and seal strength (force) may be obtained in bioriented polypropylene (BOPP) multilayer structures wherein at least one internal layer (tie layer) comprises a butene-1 copolymer elastomer or plastomer.

SUMMARY OF THE INVENTION

The present disclosure provides for bioriented polypropylene (BOPP) multilayer structures comprising:
A) a skin (outer, seal) layer comprising a crystalline propylene copolymer composition comprising (percent by weight):
  a) 20-60 wt % of a copolymer of propylene with ethylene, containing 1 to 5 wt % of ethylene; and
  b) 40-80 wt % of a copolymer of propylene with ethylene and a C4-C8 alpha-olefin, the ethylene content being 1 to 5 wt % and the C4-C8 alpha-olefin content being 6 to 15 wt %;
  the total content of ethylene in the composition being 1 to 5 wt % and the total content of C4-C8 alpha-olefin in the composition being 2.4 to 12 wt %.

The C4-C8 alpha-olefin may be selected from butene-1, 1-pentene, 1-hexene, 4-methyl-1-pentene and 1-octene. The above comonomer content (ethylene or alpha olefin) is referred to units in the polymer chain derived from the polymerized comonomer.

The multilayer structures of the present technology may further comprise a tie layer comprising a butene-1 polymer having:
  a content of butene-1 derived units of 80 wt % or more, including 84 wt % or more;
  a flexural modulus (MEF) of 75 MPa or less, including 40 MPa or less such as from 10 to 30 MPa; and a core layer comprising polypropylene homopolymers having a melt flow rate higher than 2 g/10 min, including higher than 5 g/10 min such as from 5 to 10 g/10 min, and a content of fraction insoluble in xylene at room temperature (about 25° C.) of equal to or higher than 95 wt %. In some embodiments, the tie layer B is coextruded in between the skin and the core layers.

The core layer polymer may comprise a high flow polypropylene homopolymer designed for the production of biaxially oriented polypropylene films (BOPP) on tubular double bubble lines and cast film.

The skin layer polymer, i.e. the crystalline propylene copolymer composition, can be produced by conventional processes polymerizing propylene and, optionally, an alpha-olefin mentioned above in the presence of a catalyst such as a stereospecific Ziegler-Natta catalysts or a metallocene catalyst. The skin layer polymer can be prepared according to the process described in EP Pat. No. 674 991. The seal layer polymer (A) is a low seal Initiation temperature polymer that may have at least one of the following properties:
- a melting point from about 126° C. to 147° C.;
- seal initiation temperature (as defined below) from 90° C. to 114° C.; and
- a fraction soluble in n-hexane at 50° C. of less than 5.5% by weight, including from 3.5 to 4.5% by weight.

"Seal initiation temperature", or S.I.T., (also referred to as heat-seal temperature) is the minimal temperature needed to form a seal of one polypropylene film layer to one film layer prepared from the composition of the seal layer polymer, so that the seal does not fail, i.e. the film layers do not separate at the seal, when a 2 N load is applied to this multilayer film.

The tie layer polymer is a butene-1 polymer, that is a homopolymer or a copolymer of butene-1 with at least one other alpha-olefin optionally having at least one of the following properties:
- a molecular weight (Mw) higher than 100.000, including higher than 200.000 and higher than 300.000;
- a density of 0.895 g/cm$^3$ or less, such as from 0.865 to 0.895 g/cm$^3$; and
- a MFR at 190° C., 2.16 kg, of 0.3-10 g/10 min., such as from 0.3-5 g/10 min.

In some embodiments, the tie layer butene-1 polymer is selected from the group consisting of:
(b1) a butene-1 homopolymer or copolymer of butene-1 with at least another alpha-olefin, optionally with propylene as comonomer, having
- a content of butene-1 units in the form of isotactic pentads (mmmm) from 25 to 55%;
- an intrinsic viscosity [η] measured in tetraline at 135° C. from 1 to 3 dL/g;
- a content of xylene insoluble fraction lower than 60 wt % at 0° C., such as from 3 to 60 wt %; and
- a melting temperature (Tm(II)) of equal to or higher than 100° C.;
(b2) a butene-1/ethylene copolymer or a butene-1/ethylene/propylene terpolymer, having one or more of the following properties:
- distribution of molecular weights (Mw/Mn) measured by GPC lower than 3;
- no melting point (TmII) detectable at the DSC measured according to the DSC method described herein;
- intrinsic viscosity (I.V.) measured in tetrahydronaphtalene (THN) at 135° C.>1.2 dL/g; and
- isotactic pentads (mmmm)>90%, Component (b1) may be, in some embodiments, a copolymer having an amount of comonomer content (propylene derived units) in (b1) of from 3 to 5 wt %; such as from 3.5 to 4.5 wt % of comonomer.

Component (b2) has, in certain embodiments, a measurable melting enthalpy after aging. For instance, when measured after 10 days of aging at room temperature, the melting enthalpy of (b2) can be less than 25 J/g, including from 4 to 20 J/g. The butene-1 copolymer (b2) immediately after melting does not show a melting point associated to polybutene-1 crystallinity, however it is crystallizable, i.e. after about 10 days following melting the polymer shows measurable melting point and a melting enthalpy as measured by DSC. The butene-1 polymer therefore has no melting temperature attributable to polybutene crystallinity (TmII) DSC, which can be measured after cancelling the thermal history of the sample, according to the DSC method described herein. The amount of comonomer (ethylene derived units) in (b2) may be from 0.2 to 15% by mol, including from 5 to 13% by mole corresponding to from 0.1 to 8 wt %; including from 2.5 to 7 wt % of comonomer.

DETAILED DESCRIPTION OF THE INVENTION

The polymerization process for butene-1 (co)polymers (b1) and (b2) can be carried out according to previously described techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. In some embodiments, the polymerization may be carried out in the liquid butene-1 as a reaction medium.

The polymerization temperature may be, in some embodiments, between −100° C. and +200° C., such as from 20 to 120° C., from 40 to 90° C. and from 50° C. to 80° C. The polymerization pressure, in certain embodiments, may be between 0.5 and 100 bar. The polymerization may be carried out in one or more reactors that can work under same or different reaction conditions such as concentration of molecular weight regulator, comonomer concentration, temperature, pressure, etc.

The butene-1 (co)polymer (b1) of the present technology can be prepared by polymerization of the monomers in the presence, in some embodiments, of a low stereospecificity Ziegler-Natta catalyst comprising (A) a solid component comprising a Ti compound and an internal electron-donor compound supported on MgCl$_2$; (B) an alkyl aluminum compound and, optionally, (C) an external electron-donor compound. In certain embodiments, in the process for the preparation of the (co)polymers of the present disclosure the external electron donor compound is not used in order not to increase the stereoregulating capability of the catalyst. When the external electron donor is used, its amount and modalities of use should be such as not to generate an excessively high amount of highly stereoregular polymer such as described in WO2006/042815 A1. The butene-1 copolymers thus obtained have, in further embodiments, a content of butene-1 units in the form of isotactic pentads (mmmm) from 25 to 56%.

The butene-1 copolymer (b2) can be obtained polymerizing the monomer(s) in the presence of a metallocene catalyst system obtainable by contacting:
- a stereorigid metallocene compound;
- an alumoxane or a compound capable of forming an alkyl metallocene cation; and, optionally,
- an organo aluminum compound.

Examples of such catalyst systems and of polymerization processes employing such catalyst system to obtain the butene-1 copolymer b2 can be found in WO2004/099269. Alternatively, butene-1 copolymer (b2) may be substituted with polymers having higher comonomer content obtainable according to processes and conditions as described in WO2009/000637.

The butene-1 copolymers described herein may exhibit high molecular weight such that in terms of intrinsic viscosity (IV) the copolymers are characterized by values higher than 1 dl/g, including higher than 1.5 dl/g. The intrinsic viscosity (IV) is, in certain embodiments, not greater than 3. Higher IV has been previously associated with poor processability of the copolymer.

The butene-1 copolymers for the use according to the present technology have a relatively low crystallinity of less than 35% measured via X-ray, such as from 20 to 30%.

In some embodiments, the tie layer butene-1 polymer (b) has a glass transition temperature (Tg) measured via DMTA equal to or lower than −5° C., such as from −10° C. to −5° C.

The tie layer polymer can optionally comprise, in addition to the butene-1 copolymer plastomer a small amount (from 3-10%, including from 6 to 8% by weight), of a crystalline propylene polymer added, e.g. by in-line compounding, to improve processability and reducing stickiness of the plastomer without significantly altering the properties of the plastomer (e.g. ADSYL 5 C 30F, MIL 5.50 g/10 min at 230° C./2.16 kg, sold by Lyondell Basell).

Conventional additives used in olefin polymers may be added, including but not limited to nucleating agents, antisticking agents, processing aids, stabilizing agents (against heat, light, U.V.) and other additives typical for film applications such as plasticizers, antiacids, antistatic and water repellent agents, slip agents and antiblocking agents.

The particulars are given in the following examples, and detailed description which are given to illustrate, without limiting, the present technology.

EXAMPLES

Films according to the present technology may comprise the A/B/C three layer structure as above detailed. The three-layer (A/B/C) film may have a thickness of from 100 to 500 μm, including about 150 μm (e.g. with a thickness ratio of the layers 50/50/50, different thickness ratio of the layers might be possible without departing from the scope of the present disclosure). Films according to the present technology can be obtained by coextrusion on a three-extruder extrusion line and then the coextruded films can be compression molded together with a homopolymer film having a thickness of about 1000 μm. The resulting homopolymer film having a thickness of about 1000 μm is made of a polypropylene homopolymer designed for the production of biaxially oriented polypropylene that can be same or different from the core layer polymer C. After compression molding, a 3 layer composite sheet is created (approximately 1100 μm thick). The resulting core layer in the composite film after compression molding largely comprises the C layer, as defined above, and the additional thicker homopolymer film (support). It is equivalent to obtain such composite sheets directly by coextrusion, with an extruder line of sufficient capacity, extruding a much thicker core and support layer (e.g. with a thickness ratio of 50/50/1000 with respect to the three layers) and advantageously avoiding the compression molding step.

Thus, a further object of the present technology is a three-layer (A/B/C) composite film, wherein layer C is made up of a core layer as above defined and/or a further thicker compression molded or coextruded support layer. The support layer can be made of the same or a different core layer homopolymer designed for BOPP, including those described herein.

The final multilayer composite film is then cut to size and oriented via batch wise process. Biorientation can be obtained via known industrial continuous processes including tubular film process technologies and flat film (cast) process technologies.

The final multilayer structures may be characterized by a total thickness of less than 100 μm, including from 20 to 50 μm.

The films of the present technology can be prepared by previously described techniques such as extrusion and calendaring followed by orientation. Specific examples of films of the present technology are disclosed hereinafter in the test for determining the seal initiation temperature (S.I.T.) and the hot tack.

The following analytical methods have been used to determine the properties reported in the detailed description and in the examples.

Comonomer contents: determined by IR spectroscopy or NMR (when specified).

For the propylene copolymers the content of comonomer was determined via FT-IR and produced the following wavelengths:

C2: 732 $cm^{-1}$
C4: 765 $cm^{-1}$

For the tie layer, butene-1 copolymers component (b), the amount of comonomers was calculated from $^{13}$C-NMR spectra of the copolymers of the examples. Measurements were performed on a polymer solution (8-12% by weight) in dideuterated 1,1,2,2-tetrachloro-ethane at 120° C. The $^{13}$C NMR spectra were acquired on a Bruker AV-600 spectrometer operating at 150.91 MHz in the Fourier transform mode at 120° C. using a 90° pulse, 15 seconds of delay between pulses and CPD (WALTZ16) to remove $^1$H-$^{13}$C coupling. About 1500 transients were stored in 32K data points using a spectral window of 60 ppm (0-60 ppm).

Copolymer Composition

Diad distribution is calculated from $^{13}$C NMR spectra using the following relations:

$$PP=100I_1/\Sigma$$

$$PB=100I_2/\Sigma$$

$$BB=100(I_3-I_{19})/\Sigma$$

$$PE=100(I_5+I_6)/\Sigma$$

$$BE=100(I_9+I_{10})/\Sigma$$

$$EE=100(0.5(I_{15}+I_6+I_{10})+0.25(I_{14}))/\Sigma,$$

where $\Sigma=I_2+I_3-I_{19}+I_5+I_6+I_9+I_{10}+0.50(I_{15}+I_6+I_{10})+0.25(I_{14})$.

The molar content is obtained from diads using the following relations:

$$P(m\%)=PP+0.5(PE+PB)$$

$$B(m\%)=BB+0.5(BE+PB)$$

$$E(m\%)=EE+0.5(PE+BE)$$

$I_1$, $I_2$, $I_3$, $I_5$, $I_6$, $I_9$, $I_{10}$, $I_{14}$, $I_{15}$, $I_{19}$ are integrals of the peaks in the $^{13}$C NMR spectrum (peak of EEE sequence at 29.9 ppm is used as the reference peak). The assignments of these peaks are made according to J. C. Randal, *Macromol. Chem Phys.*, C29, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983), and the peaks are collected in Table A (nomenclature according to C. J. Carman, R. A. Harrington and C. E. Wilkes, *Macromolecules*, 10, 536 (1977)).

TABLE A

| I | Chemical Shift (ppm) | Carbon | Sequence |
|---|---|---|---|
| 1 | 47.34-45.60 | $S_{\alpha\alpha}$ | PP |
| 2 | 44.07-42.15 | $S_{\alpha\alpha}$ | PB |
| 3 | 40.10-39.12 | $S_{\alpha\alpha}$ | BB |
| 4 | 39.59 | $T_{\delta\delta}$ | EBE |
| 5 | 38.66-37.66 | $S_{\alpha\gamma}$ | PEP |

TABLE A-continued

| I | Chemical Shift (ppm) | Carbon | Sequence |
|---|---|---|---|
| 6 | 37.66-37.32 | $S_{\alpha\delta}$ | PEE |
| 7 | 37.24 | $T_{\beta\delta}$ | BBE |
| 8 | 35.22-34.85 | $T_{\beta\beta}$ | XBX |
| 9 | 34.85-34.49 | $S_{\alpha\gamma}$ | BBE |
| 10 | 34.49-34.00 | $S_{\alpha\delta}$ | BEE |
| 11 | 33.17 | $T_{\delta\delta}$ | EPE |
| 12 | 30.91-30.82 | $T_{\beta\delta}$ | XPE |
| 13 | 30.78-30.62 | $S_{\gamma\gamma}$ | XEEX |
| 14 | 30.52-30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28-27.54 | $2B_2$ | XBX |
| 18 | 27.54-26.81 | $S_{\beta\delta} + 2B_2$ | BE, PE, BBE |
| 19 | 26.67 | $2B_2$ | EBE |
| 20 | 24.64-24.14 | $S_{\beta\beta}$ | XEX |
| 21 | 21.80-19.50 | $CH_3$ | P |
| 22 | 11.01-10.79 | $CH_3$ | B |

N-Hexane Extractables:

Determined by suspending in an excess of hexane a 100 micrometer thick film specimen of the composition being analyzed, in an excess of hexane, in an autoclave at 50° C. for 2 hours. Then the hexane is evaporated and the dried residue is weighted.

Melt Flow Rate MFR

Determined according to ISO 1133, at 230° C., 2.16 kg load for propylene polymers, at 190° C., 2.16 kg load for butene-1 and ethylene polymers.

Intrinsic Viscosity [η]:

Measured in tetrahydronaphthalene (THN, tetralin) at 135° C.

Flexural Modulus:

Determined according to ISO method 178 on compression molded plaques prepared according to ISO8986.

Tensile properties (Tensile Stress at Break, Elongation at Break, Stress at Yield, Elongation at Yield): Determined according to ISO 527-1,-2 on compression molded plaques prepared according to ISO8986.

Tension set: Determined according to ISO 2285 on compression molded plaques prepared according to ISO8986.

Hardness (Shore A): Determined according to ISO 868 on compression molded plaques prepared according to ISO8986.

Tg: Determined via DMTA analysis.

Compression Molded specimen of 76 mm by 13 mm by 1 mm are fixed to the DMTA machine for tensile stress. The frequency of the tension is fixed at 1 Hz. The DMTA translates the elastic response of the specimen starting from −100° C. to 130° C. In this way it is possible to plot the elastic response versus temperature. The elastic modulus for a viscoelastic material is defined as E=E'+iE". The DMTA can split the two components E' and E" by their resonance and plot E' vs temperature and E'/E"=tan (δ) vs temperature. The glass transition temperature Tg is assumed to be the temperature at the maximum of the curve E'/E"=tan (δ) vs temperature.

Determination of X-Ray Crystallinity

The X-ray crystallinity was measured with an X-ray diffraction powder diffractometer using the Cu-Kα1 radiation with fixed slits and collecting spectra between diffraction angle 2Θ=5° and 2Θ=35° with step of 0.1° every 6 seconds.

Measurements were performed on compression molded specimens in the form of disks of about 1.5-2.5 mm in thickness and 2.5-4.0 cm in diameter. These specimens are obtained in a compression molding press at a temperature of 200° C.±5° C. without any appreciable applied pressure for 10 minutes. A pressure of about 10 Kg/cm² was then applied for about few second and this process was repeated 3 times.

The diffraction pattern was used to derive all of the components necessary for the degree of crystallinity by defining a suitable linear baseline for the whole spectrum and calculating the total area (Ta), expressed in counts/sec·2Θ, between the spectrum profile and the baseline.

Then an amorphous profile was defined, along the whole spectrum, that separates, according to the two phase model, the amorphous and crystalline regions. It is therefore possible to calculate the amorphous area (Aa), expressed in counts/sec·2Θ, as the area between the amorphous profile and the baseline; and the crystalline area (Ca), expressed in counts/sec·2Θ, as Ca=Ta−Aa.

The degree of crystallinity of the sample was calculated according to the formula: % Cr=100×Ca/Ta.

The Melting Temperature (Tm) of Propylene Polymers—(ISO 11357-3)

The melting temperature was determined by differential scanning calorimetry (DSC). A sample weighing 6±1 mg is heated to 200±1° C. at a rate of 20° C./min and kept at 200±1° C. for 2 minutes in a nitrogen stream and cooled at a rate of 20° C./min to 40±2° C., then kept at this temperature for 2 min to crystallize the sample. Then, the sample is again heated at a temperature rise rate of 20° C./min up to 200° C.±1. The heating scans are recorded, thermograms are obtained, and temperatures corresponding to temperature peaks are read. The melting point can be determined either in the first or in the second heating run, or in both runs. The temperature corresponding to the most intense melting peak recorded during the relevant heating run is taken as the melting temperature.

The Melting Temperatures of the Tie Layer (b) Butene-1 Polymers (TmII) were measured by differential scanning calorimetry (DSC) on a Perkin Elmer DSC-7 instrument, according to the following method.

A weighted sample (5-10 mg) obtained from the polymerization was sealed into an aluminum pan and heated at 200° C. with a scanning speed of 20° C./minute. The sample was kept at 200° C. for 5 minutes to allow a complete melting of all of the crystallites. Successively, after cooling to −20° C. with a scanning speed corresponding to 10° C./minute, the peak temperature was taken as crystallization temperature (Tc). After maintaining the sample for 5 minutes at −20° C., the sample was heated for the second time to 200° C. with a scanning speed corresponding to 10° C./min. In this second heating run, the peak temperature was taken as the melting temperature (TmII) of crystalline form 2 (the first to form, being favored kinetically) and the area as global melting enthalpy (ΔHfII).

The melting enthalpy after 10 days was measured as follows by differential scanning calorimetry (DSC) on a Perkin Elmer DSC-7 instrument.

A weighted sample (5-10 mg) obtained from the polymerization process was sealed into aluminum pans and heated at 200° C. with a scanning speed corresponding to 20° C./minute. The sample was kept at 200° C. for 5 minutes to allow a complete melting of all of the crystallites. The sample was then stored for 10 days at room temperature. After 10 days the sample was subjected to DSC, cooled to −20° C., and heated to 200° C. with a scanning speed corresponding to 10° C./min. In this heating run, the peak temperature was taken as the melting temperature (Tm) and the area as global melting enthalpy after 10 days (ΔHf).

Molecular Weight and Molecular Weight Distribution (MWD)

The molecular weight and MWD were measured by way of gel permeation chromatography (GPC) in 1,2,4-trichlorobenzene. Molecular weight parameters ($\overline{M}_n$, $\overline{M}_w$, $\overline{M}_z$) and molecular weight distributions (e.g. MWD=Mw/Mn) for all of the samples were measured using a Waters GPCV 2000 apparatus, which was equipped with a column set of four PLgel Olexis mixed-gel (Polymer Laboratories) and an IR4 infrared detector (PolymerChar). The dimensions of the columns were 300×7.5 mm and the particle size was 13 μm. The mobile phase used was 1-2-4-trichlorobenzene (TCB) and the flow rate was kept at 1.0 mL/min. All measurements were carried out at 150° C. The solution concentrations were 0.1 g/dL in TCB and 0.1 g/L of 2,6-diterbuthyl-p-chresole were added to prevent degradation. For GPC calculations, a universal calibration curve was obtained using 10 polystyrene (PS) standard samples supplied by Polymer Laboratories (with peak molecular weights ranging from 580 to 8,500,000). A third order polynomial fit was used for interpolating the experimental data and obtaining the relevant calibration curve. Data acquisition and processing was done using Empower (Waters). The Mark-Houwink relationship was used to determine the molecular weight distribution and the relevant average molecular weights: the K values were $K_{PS}=1.21\times10^{-4}$ dL/g and $K_{PB}=1.78\times10^{-4}$ dL/g for PS and PB, respectively, while the Mark-Houwink exponents α=0.706 for PS and α=0.725 for PB were used.

For butene/ethylene copolymers, as far as the data evaluation is concerned, it was assumed for each sample that the composition was constant in the whole range of molecular weight and the K value of the Mark-Houwink relationship was calculated using the linear combination below:

$$K_{EB}=x_E K_{PE}+x_P K_{PB}$$

where $K_{EB}$ is the constant of the copolymer, $K_{PE}$ (4.06×10$^{-4}$, dL/g) and $K_{PB}$ (1.78×10$^{-4}$ dL/g) are the constants of polyethylene and polybutene, $x_E$ and $x_B$ are the ethylene and the butene wt % content. The Mark-Houwink exponents α=0.725 were used for all the butene/ethylene copolymers independent of their composition.

For butene/propylene copolymers, as PP and PB have very similar K, no corrections were applied and the copolymer was integrated using the K and α values of PB.

Density: Determined according to ISO 1183. The method ISO is based on observing the level to which a test specimen sinks in a liquid column exhibiting a density gradient.

Standard specimens are cut from strands extruded from a grader (MFR measurement). The polybutene-1 specimen is putted in an autoclave at 2000 bar for 10 min at a room temperature in order to accelerate the transformation phase of the polybutene. After this the specimen is inserted in the gradient column where density is measured according to ISO 1183.

Xylene Soluble and Insoluble Fraction—Propylene Polymers

The xylene soluble/insoluble fractions were determined as follows: 2.5 g of polymer and 250 cm$^3$ of xylene are introduced in a glass flask equipped with a refrigerator and a magnetical stirrer. The temperature is raised in 30 minutes up to the boiling point of the xylene solvent. The resulting clear solution is then kept under reflux and stirring for 30 minutes. The closed flask is then kept for 30 minutes in a bath of ice and water and in thermostatic water bath at 25° C. for 30 minutes as well. The resulting solid is filtered on quick filtering paper. 100 cm$^3$ of the filtered liquid is then poured into a previously weighed aluminum container which is heated on a heating plate under nitrogen flow to remove the solvent by evaporation. The container is then kept in an oven at 80° C. under vacuum until constant weight is obtained.

Xylene Soluble and Insoluble Fraction at 0° C.—Butene-1 Polymers

The xylene soluble/insoluble fractions for butene-1 polymers were determined as follows: 2.5 g of polymer are dissolved in 250 ml of xylene at 135° C. under agitation. After 20 minutes, the solution is cooled to 0° C. under stirring, and then allowed to settle for 30 minutes. The precipitate is filtered with filter paper and the solution is evaporated under a nitrogen current, with the residue dried under vacuum at 140° C. until the weight stabilizes. The weight percentage of polymer soluble in xylene at 0° C. is then calculated.

$^{13}$C-NMR Isotacticity Index—Butene-1 Polymers

For this measurement, 40 mg of each sample are dissolved in 0.5 mL of $C_2D_2Cl_4$. The $^{13}$C NMR spectra are acquired on a Bruker AV-600 equipped with cryoprobe (150.91 Mhz, 90° pulse, 15 s delay between pulses). About 512 transients are stored for each spectrum; mmmm pentad peak (27.73 ppm) is used as reference. The microstructure analysis is carried out as described in literature (Macromolecules 1991, 24, 2334-2340, by Asakura T. et Al. and Polymer, 1994, 35, 339, by Chujo R. et Al.).

The percentage value of pentad tacticity (mmmm %) is the percentage of stereoregular pentads (isotactic pentad) as calculated from the relevant pentad signals (peak areas) in the NMR region of branched methylene carbons (around 27.73 ppm assigned to the BBBBB isotactic sequence), with consideration of the superposition between stereo-irregular pentads and signals falling in the same region due to the presence of the alfa-olefin comonomer.

Determination of the Hot Tack Strength and of the Seal Strength and SIT

For hot tack strength measurements, the following method is followed (ASTM F 1921): For each test film specimens 15 mm wide are superimposed in alignment, the adjacent layers being layers of the particular test composition. The seals are made at increasing temperatures (5° C. steps) with a J&B Hot Tack Tester 3000 sealer, equipped with brass teflon coated sealing bars at one end of the said superimposed specimens along the 15 mm side. The hot tack strength is measured by peeling the specimens at a speed of 100 mm/sec. The sealing conditions are:

sealing pressure: 0.1 MPa (14.5 psi); and dwell time: 0.5 sec.

The test is carried out immediately after sealing (0.2 sec). The hot tack strength is given by the load required to separate the sealed specimens. For the seal strength measurements, the superimposed specimens are sealed along one of the 15 mm sides with a RDM HSE-3 five bars sealer type. The sealing time is 0.5 seconds at a pressure of 0.1 MPa (14.5 psi). The sealing temperature is increased for each seal with steps of 5° C., starting from a sufficiently low temperature to make it possible to determine the level of sealing force. The sealed samples are left to cool for 24 hours and then their unsealed ends are attached to an Instron machine (4301 model) where they are tested at a crosshead speed of 100 mm/min (grip distance 50 mm). The reference is standard ASTM F 88.

The S.I.T. (seal initiation temperature) is the minimum sealing temperature at which the seal shows a sealing force of 2.0 Newton in the above said test conditions. The sealing temperature is increased for each seal with steps of 2° C.

Examples 1 and 2 and Comparison Example 3C 4C and Reference Example

The following materials are used as polymer components of layer A), B) and C) and for the additional support layer (homopolymer film as above said coextruded or compression molded or calendered on to the free surface of core layer C).

A) Seal Layer Polymer

PP-1 low S.I.T. crystalline propylene terpolymer blend having MFR 5.50 g/10 min at 230° C./2.16 kg, melting temperature DSC Tm of 132.3° C.; Seal initiation temperature 105° C., total content of ethylene derived units of 3.2 wt %, and total content of butene-1 derived units of about 6 wt %, prepared according to the process and procedure in Example 1 of WO 06/74991. PP-1 is made of 35 wt % of a propylene-ethylene copolymer having 3.2 wt % of ethylene derived units; and 65 wt % of a propylene ethylene butene-1 terpolymer having 3.3 wt % of ethylene derived units and 9.2 wt % of butene-1 derived units.

B) Tie Layer Polymer

PB1 is a butene-1 copolymer with propylene produced with Ziegler Natta catalyst in absence of external donor according to the process described in the WO 2006/042815 A1.

PB2 is a butene-1/ethylene copolymer produced according to the process described in WO2004/099269.

The butene-1 copolymers of the examples were pelletized and dried with the use of commercial additives and antisticking agents to improve flowability and contribute to the processability of the compositions. Finishing treatments lead to a total amount of additives in the final pellets of less than 10 wt %, including less than 1.0 wt %, less than 0.5 wt % and less than 0.2 wt % (about 100-1500 ppm per additive or less). Examples of such finishing treatments can be found in the PCT/EP2010/056159.

Table 1 discloses the structures and properties of butene-1 copolymers used in the examples for the tie layer (b) according to the present technology:

TABLE 1

|  |  | PB1 Plastomer type | PB2 Plastomer type |
|---|---|---|---|
|  |  | b1 C4C3 | b2 C4C2 |
| C3 content (NMR) | wt % | 3.9 | — |
| C2 content (NMR) | wt % | — | 4.8 (IR 5.4)** |
| Intrinsic Viscosity | dl/g | 2.3 | 1.95 |
| Melt Flow Rate - @ 190/2.16 | g/10 min | 0.45 | 1 |
| Density | g/cc | 0.8786 | 0.8830 |
| Flexural elastic modulus (ISO 178) | MPa | 31 | 75 |
| Hardness Shore A (ISO 868) |  | 74.5 | 89.4 |
| Tg (DMTA) | ° C. | −5.8 | −22 |
| % cristall. RX | % | 29 | 25 |
| DSC Tm II* | ° C. | 100 | nd |
| DSC Tm I |  | 118 | 49 |
| S.X.0/0° C. Soluble Total | wt % | 57 | 99 |
| mmmm % | % | 54 | 90 |
| Mw/Mn |  | 6.1 | 2.8 |
| ΔHf after 10 days | J/g | — | 26.97 |

TABLE 1-continued

|  | PB1 Plastomer type | PB2 Plastomer type |
|---|---|---|
|  | b1 C4C3 | b2 C4C2 |
| 1, 4 insertions | absent | na |
| Strain at break ISO527 | 410 | 550 |
| Stress at break ISO527 | 12.9 | 16.9 |
| Tension set, 100% at 23° C. | 39 | 58 |

Nd = not detectable
Na = data not available
*from DSC thermogram collected in second heating run (after cancelling the thermal history of the sample)
**IR analytical wavelength about 727 cm$^{-1}$ C) Core Layer Polymer PP-2 is a polypropylene homopolymer having a melt flow rate (MFR) of 8.0 g/10 min (230° C./2.16 kg) and a xylene soluble fraction (XS) at room temperature (25° C.) of 3.8 wt %.

PP-3 is used as a further homopolymer support layer (coextruded or compression molded on the external surface of layer C). PP-3 is a polypropylene homopolymer having a melt flow rate (MFR) of 2 g/10 min (230° C./2.16 kg) and a xylene soluble fraction (XS) at room temperature (25° C.) of 4 wt %.

Film Preparation

BOPP films were produced using the following multi-step process: First, a three-layer (A/B/C) film having a thickness of about 150 μm (50/50/50) is coextruded on a three-extruder Dr. Collin extrusion line. The coextruded films were then compression molded together with a homopolymer film having a thickness of about 1000 μm. The propylene homopolymer film was made of PP-3 to create a 3 layer composite sheet (approximately 1100 μm) (PP-2 and PP-3 layers being counted as one uniform core/support layer after compression molding). These composite sheets were then cut to size and oriented via batch wise process using a Brückner KARO IV Film Stretcher, which is a lab scale stretching device. Similar orientation conditions are used for each material. The extrusion, compression molding and stretching conditions are provided below.

Extrusion Conditions:

Dr. Collin Extruder line; 30 mm, 30 L/D (layer A):
Cylinder #1 (set): 180° C.;
Cylinder #2 (set): 190° C.;
Cylinder #3 (set): 200° C.;
Cylinder #4 (set): 210° C.;
Adapter #1 (set): 220° C.;
Screw speed: 90-95 rpm
Melt temperature: 210-220° C.

Dr. Collin Extruder line; 30 mm, 30 L/D (layer C):
Cylinder #1 (set): 180° C.;
Cylinder #2 (set): 190° C.;
Cylinder #3 (set): 200° C.;
Cylinder #4 (set): 210° C.;
Adapter #1 (set): 220° C.;
Screw speed: 90-95 rpm
Melt temperature: 210-220° C.

Dr. Collin Extruder line; 45 mm, 30 L/D (layer B):
Cylinder #1 (set): 190° C.;
Cylinder #2 (set): 210° C.;
Cylinder #3 (set): 230° C.;
Cylinder #4 (set): 230° C.;

Adapter #1 (set): 230° C.;
Screw speed: 20-26 rpm
Melt temperature: 175-236° C.
Cast roll unit speed: 7-8 m/min;
Cast roll surface temperature: 20° C.;
Compression molding conditions: A PHI compression molder was used as follows:
Superimposed films of said homopolymers PP-3 and heat seal material three layer A/B/C film, were placed between sheets of Mylar film then between two steel plates;
The plate sandwich was placed in the PHI press at 200° C. for 2 minutes at 3 tons of pressure;
The plate sandwich was then removed from the press and inserted into another press set at 22-25° C. for 2 minutes at 3 tons of pressure;
The plates were separated and the sample removed.
Stretching Conditions
The Brückner KARO IV Film Stretcher was used as follows:
A sample was cut from compression molded sheet;
The sample was loaded into the KARO IV Film Stretcher at 160° C., allowed to preheat for 30 seconds, and then stretched 6× by 6× at a rate of 84%/sec;
The sample was removed from the unit and allowed to cool.

The final composite multilayer films have an A/B/C structure, where in the films of Examples 1 and 2 the B layer was made of PB1 or PB2 respectively, while the A layer was made of PP-1, and the C layer was made of PP-2 plus a thick support layer made of PP-3. The final thickness of the bioriented film (after stretching) was about 30 μm and the thickness ratio of the layers is about 4/4/92.

In the comparative examples only the tie layer polymer is changed.

For Film A (Reference Example), the same PP-2 homopolymer is used as tie layer polymer.

For Film D (Comparative Example 3C), a heterophasic polypropylene soft composition HECO1 is used as the tie layer. HECO1 is a polymer composition (reactor blend) having a MFR of 5.2 g/10 min (230° C./2.16 kg) made of:
46 wt % of a random copolymer of propylene matrix having a MFR of 65 g/10 min (230° C./2.16 kg), a Tm (DSC) of 138° C. and an amount of ethylene derived units of 3.5 wt %; and
54 wt % of a propylene/ethylene copolymer rubber (bipo) having an intrinsic viscosity of 2.1 dl/g.

For Film E (Comparative Example 4C), a polymer PP-4 is used as the tie layer. PP-4 is a random propylene/butene-1 copolymer composition having an MFR of 5.5 g/10 min (230° C./2.16 kg), a melting temperature $(T_m)$ of 137° C. and a SIT Seal initiation temperature of 112° C.; made of:
70 wt % of a propylene butene-1 copolymer, amount of butene-1 derived units 9.5 wt %
30 wt % of a propylene butene-1 copolymer, amount of butene-1 derived units 16.0 wt %

The properties of the films are reported in Table 2.

As shown in Table 2, the tie layer polymer of the present technology provides a reduction of the SIT value with respect to the reference sample (simulating the absence of the tie layer) and Comparative Examples 3C and 4C (comprising different low SIT soft material in the tie layer).

The seal strength is stable and high (above 4 N) in a temperature range of 110 to 130° C. The value of hot tack strength is also satisfactory in a range between 115 to 140° C., where the value undergoes only minor variations (it is, however, stable in the sealing window) with both PB1 and PB2.

Particularly multilayer structures comprising PB1 as tie layer (plastomer obtained with ZN catalyst) exhibit beneficial properties such as seal strength stability (above 5 N at greater than 110° C.) and higher values of hot tack strength (well above 2 N) in the range of 110 to 140° C.

TABLE 2

| Structure | Thickness Micron (in coextrusion step) | Film A Example Reference (no tie layer polymer) | Film B Example 1 | Film C Example 2 | Film D Example 3C (comparative) | Film E Example 4C (comparative) |
|---|---|---|---|---|---|---|
| First skin layer | 50 | PP-1 C3C4C2 | PP-1 C3C4C2 | PP-1 C3C4C2 | PP-1 C3C4C2 | PP-1 C3C4C2 |
| Tie layer | 50 | PP-2 C3 | PB1 C4C3 | PB2 C4C2 | HECO1 C3C2 | PP-4 C3C4C2 |
| Core Layer | 50 | PP-2 C3 | PP-2 C3 | PP-2 C3 | PP-2 C3 | PP-2 C3 |

| | Temp. ° C. | MaxForce (N) A | MaxForce (N) B | MaxForce (N) C | MaxForce (N) D | MaxForce (N) E |
|---|---|---|---|---|---|---|
| Hot Tack Strengh | 95 | 0.00 | 0.00 | 0.00 | 0.00 | 0.00 |
| | 100 | 0.30 | 1.00 | 1.06 | 0.30 | 0.57 |
| | 105 | 1.11 | 1.78 | 1.83 | 1.13 | 1.55 |
| | 110 | 2.24 | 2.13 | 1.92 | 1.55 | 2.42 |
| | 115 | 2.67 | 2.57 | 1.97 | 2.24 | 2.85 |
| | 120 | 2.50 | 3.02 | 1.93 | 2.37 | 3.08 |
| | 125 | 2.11 | 2.99 | 1.72 | 2.13 | 2.75 |
| | 130 | 2.01 | 2.45 | 1.80 | 1.46 | 2.80 |
| | 135 | 2.15 | 2.16 | 2.26 | 1.29 | 2.47 |
| | 140 | 1.76 | 2.12 | 0.79 | 1.30 | 2.42 |
| | 145 | 1.68 | | | | |
| | 150 | 1.73 | 1.83 | | 1.51 | 2.03 |
| | 160 | 1.55 | 2.64 | | 1.49 | 2.29 |
| | 170 | 1.61 | 1.87 | | 0.44 | 1.24 |
| | 180 | 1.13 | 1.27 | | | |

TABLE 2-continued

| | | | | | | |
|---|---|---|---|---|---|---|
| Sealing Curve | 95 | 0.2 | | 0.1 | | |
| | 100 | 0.4 | 0.2 | 0.9 | 0.2 | 0.1 |
| | 105 | 3.6 | 1.9 | 3.8 | 1.5 | 1.7 |
| | 110 | 3.4 | 5.2 | 5.6 | 3.6 | 2.8 |
| | 120 | 3.0 | 5.5 | 4.0 | 4.0 | 3.5 |
| | 130 | 2.9 | 5.7 | 5.1 | 4.2 | 4.1 |
| | | | 5.3 | 4.9 | 4.2 | 4.2 |
| SIT (° C.) Brugger | | 103 | 106 | 106 | 108 | 109 |

What is claimed is:

1. A bioriented multilayer structure comprising:
   A) a skin layer comprising a crystalline propylene copolymer composition comprising:
      a) 20-60 wt % of a copolymer of propylene with ethylene comprising 1-5 wt % of ethylene; and
      b) 40-80 wt % of a copolymer of propylene with ethylene and a C4-C8 alpha-olefin, wherein the ethylene content is 1-5 wt % and the C4-C8 alpha-olefin content is 6-15 wt %;
         wherein the total content of ethylene in the composition A) is 1-5 wt %, the total content of C4-C8 alpha-olefin in the composition is 2.4-12 wt % and comprising the following properties: a) a melting point from about 126-147° C.; b) a seal initiation temperature (SIT) from 90-114° C.; and c) a fraction soluble in n-hexane of 3.5-4.5% by weight;
   B) a tie layer comprising a butene-1 polymer comprising:
      a content of butene-1 derived units of 80 wt % or more, and
      a flexural modulus of 75 MPa or less; and
   C) a core layer comprising one or more polypropylene homopolymers having a melt flow rate of greater than 2 g/10 min and a content of xylene insoluble fraction at room temperature of equal to or greater than 95 wt %.

2. The bioriented multilayer structure of claim 1, wherein the tie layer butene-1 polymer is selected from the group consisting of:
   (b1) a butene-1 homopolymer or copolymer of butene-1 with at least another alpha-olefin with propylene as comonomer comprising:
      a content of butene-1 units in the form of isotactic pentads (mmmm) from 25 to 55%;
      an intrinsic viscosity [η] measured in tetraline at 135° C. from 1 to 3 dL/g;
      a content of xylene insoluble fraction equal to or less than 60 wt % at 0° C.; and
   (b2) a butene-1/ethylene copolymer or a butene-1/ethylene/propylene terpolymer comprising:
      a Mw/Mn measured by GPC of equal to or less than 3;
      no melting point (TmII) that is detectable at the differential scanning calorimetry (DSC).

3. The bioriented multilayer structure of claim 1, wherein layer C further comprises a compression molded or a coextruded support layer made of the same or a different core layer homopolymer.

* * * * *

UNITED STATES PATENT AND TRADEMARK OFFICE
CERTIFICATE OF CORRECTION

PATENT NO. : 10,814,588 B2
APPLICATION NO. : 14/896638
DATED : October 27, 2020
INVENTOR(S) : Grazzi et al.

It is certified that error appears in the above-identified patent and that said Letters Patent is hereby corrected as shown below:

On the Title Page

Column 1, Item (30), Line 1, delete "13170609" and insert -- 13170609.5 --, therefor Signed and Sealed this
First Day of November, 2022

Katherine Kelly Vidal
*Director of the United States Patent and Trademark Office*